UNITED STATES PATENT OFFICE 2,220,147

MANUFACTURE OF ALKYLOLAMINES

Henry Dreyfus, London, England

No Drawing. Application August 27, 1937, Serial No. 161,276. In Great Britain September 19, 1936

8 Claims. (Cl. 260—584)

This invention relates to improvements in the manufacture of alkylolamines, and particularly in the manufacture of mono-alkylolamines.

In the usual methods for the manufacture of mono-ethanolamine, for example by reacting ammonia with ethylene oxide or with ethylene chlorhydrin, the product is obtained mixed with di- and tri-ethanolamines which necessitates purification if pure mono-ethanolamine is required. I have now discovered that mono-ethanolamine can be obtained substantially free from di- or tri-ethanolamines by forming an N. hydroxyethyl compound by reacting ethylene oxide or ethylene chlorhydrin with a compound containing a primary or secondary amino radicle and subjecting the N. hydroxyethyl compound to an operation which substitutes hydrogen for the group or groups originally attached to the amino radicle. Various amino compounds may be employed as starting materials in this process, but the most suitable are those which contain a —CO— group directly attached to the amino radicle, for example acetamide, diacetamide and other mono- and di- amides, ammonium carbamate, ethyl carbamate and other urethanes and urea and alkylated ureas substituted in only one amino radicle. Other classes of substances, for example thiourea, may however also be employed.

In general the best method of converting the intermediate product into mono-ethanolamine consists in hydrolysing the intermediate product, for example with dilute acid or alkali or with hot water under pressure, though other methods, e. g., reduction, may also be employed. For example mono-ethanolamine may be obtained by reacting ammonium carbamate with ethylene oxide or ethylene chlorhydrin, preferably in the presence of alkali, and then merely heating the reaction product, e. g., to 60–70° C.

The process of the present invention may for example be carried out by passing ethylene oxide or ethylene chlorhydrin into a solution of acetamide or other substance in water or other suitable solvent, for example alcohol. The reaction may be assisted by gently heating and stirring the solution and when ethylene chlorhydrin is employed sufficient alkali may be present to neutralise the hydrochloric acid split off. After the reaction between the ethylene chlorhydrin or ethylene oxide and acetamide or other substance is completed the intermediate product may be hydrolysed or otherwise treated in order to form the ethanolamine. For example ethylene oxide may be introduced into an aqueous solution of acetamide at atmospheric temperature, and when the oxide has reacted the solution may be rendered alkaline and heated in order to decompose the intermediate product and form the ethanolamine.

The reaction between the amine and the hydroxyalkylating agent may be carried out at atmospheric pressure or under increased pressure, for example a pressure of 2 or 5 atmospheres or more, particularly when ethylene oxide or other volatile reagent is employed. In order to obtain the best yield of mono-ethanolamine it is desirable to employ the acid amide or similar compound in an amount which is considerably larger than that theoretically required, for example in an amount of 3 or 4 times as great.

The intermediate compound may, if desired, be separated from the excess acetamide or other substance before decomposition to form the ethanolamine. Separation may, for example, be effected by fractional precipitation or crystallisation.

The process of the present invention is not limited to the manufacture of mono-ethanolamine but can also be employed for the manufacture of other alkylolamines. For example, mono-propanolamine may be obtained by reacting 1-hydroxy-3-chlorpropane with a suitable compound, for example one of those mentioned above, and hydrolysing or otherwise splitting up the intermediate product. Amino alcohols containing more than one hydroxy group may also be obtained by the process of the present invention. For example, 1-amino-2.3-dihydroxy propane may be obtained by reacting α-mono-chlohydrin with acetamide or another suitable compound and hydrolysing the intermediate product.

The following example illustrates the invention, but is not to be regarded as limiting it in any way:

Example

Ethylene oxide is passed into a concentrated aqueous solution of acetamide contained in a closed vessel fitted with a stirrer, the amount of ethylene oxide introduced being about 25% of that theoretically required for the production of mono-ethanolamine, based on the amount of acetamide. The temperature of the solution is maintained at about 20 to 30° C., and the solution is stirred during the introduction of the ethylene oxide and until the reaction is substantially complete. The solution is then rendered alkaline with sodium hydroxide and is heated at 90 to 100° C. until the intermediate product is decomposed and the ethanolamine is formed. The mono-ethanolamine is then separated by fractional distillation.

Having described my invention what I desire to secure by Letters Patent is:

1. Process for the manufacture of alkylolamines, which comprises reacting a hydroxyalkylating agent with a compound of the formula $R.NH_2$, where R is the acidyl residue of a lower saturated aliphatic carboxylic acid at a temperature up to about 30° C. so as to form a compound of the formula $R.NH.R'OH$, where $R'OH$ is the residue of the hydroxyalkylating agent, and then subjecting the reaction product to hydrolysis to split off the alkylolamine.

2. Process for the manufacture of ethanolamines, which comprises reacting a hydroxyethylating agent with a compound of the formula $R.NH_2$, where R is the acidyl residue of a lower saturated aliphatic carboxylic acid at a temperature up to about 30° C. so as to form a compound of the formula $R.NH.C_2H_4OH$, and then subjecting the reaction product to hydrolysis to split off the ethanolamine.

3. Process for the manufacture of alkylolamines, which comprises reacting a hydroxyalkylating agent with acetamide at a temperature up to about 30° C. so as to form a compound of the formula $CH_3.CO.NH.R'OH$, where $R'OH$ is the residue of the hydroxyalkylating agent, and then subjecting the reaction product to hydrolysis to split off the alkylolamine.

4. Process for the manufacture of ethanolamines, which comprises reacting a hydroxyethylating agent with acetamide at a temperature up to about 30° C. so as to form the compound of the formula $CH_3.CO.NH.C_2H_4OH$ and then subjecting the reaction product to hydrolysis to split off the ethanolamine.

5. Process for the manufacture of alkylolamines, which comprises reacting a hydroxyalkylating agent with a compound of the formula $R.NH_2$, where R is the acidyl residue of a lower saturated aliphatic carboxylic acid at a temperature up to about 30° C. so as to form a compound of the formula $R.NH.R'OH$, where $R'OH$ is the residue of the hydroxyalkylating agent, and then subjecting the reaction product to hydrolysis to split off the alkylolamine, the amide being employed in an amount largely in excess of that theoretically required for the production of the mono-alkylolamine.

6. Process for the manufacture of ethanolamines, which comprises reacting a hydroxyethylating agent with a compound of the formula $R.NH_2$, where R is the acidyl residue of a lower saturated aliphatic carboxylic acid at a temperature up to about 30° C. so as to form a compound of the formula $R.NH.C_2H_4OH$, and then subjecting the reaction product to hydrolysis to split off the ethanolamine, the amide being employed in an amount largely in excess of that theoretically required for the production of mono-ethanolamine.

7. Process for the manufacture of alkylolamines, which comprises reacting a hydroxyalkylating agent with a compound of the formula $R.NH_2$, where R is the acidyl residue of a lower saturated aliphatic carboxylic acid at a temperature of 20–30° C. and under a pressure of 1–5 atmospheres so as to form a compound of the formula $R.NH.R'OH$, where $R'OH$ is the residue of the hydroxyalkylating agent, and then subjecting the reaction product to hydrolysis to split off the alkylolamine, the amide being employed in an amount largely in excess of that theoretically required for the production of the mono-alkylolamine.

8. Process for the manufacture of ethanolamines, which comprises reacting a hydroxyethylating agent with acetamide at a temperature of 20–30° C. and under a pressure of 1–5 atmospheres so as to form the compound of the formula $CH_3CO.NH.C_2H_4OH$, and then subjecting the reaction product to hydrolysis to split off the ethanolamine, the acetamide being employed in an amount largely in excess of that theoretically required for the production of mono-ethanolamine.

HENRY DREYFUS.